United States Patent
Kretchmer

(10) Patent No.: US 8,341,563 B1
(45) Date of Patent: Dec. 25, 2012

(54) METHOD AND APPARATUS FOR POWER GATING STITCHING

(75) Inventor: Yoav Kretchmer, Kfar-saba (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 488 days.

(21) Appl. No.: 12/620,910

(22) Filed: Nov. 18, 2009

Related U.S. Application Data

(60) Provisional application No. 61/116,496, filed on Nov. 20, 2008.

(51) Int. Cl.
*G06F 17/50* (2006.01)

(52) U.S. Cl. ........ 716/100; 716/109; 716/110; 716/127; 716/132; 716/133

(58) Field of Classification Search .................. 716/100, 716/109–110, 119–120, 123, 127, 132–133
See application file for complete search history.

(56) References Cited

U.S. PATENT DOCUMENTS

| | | | | |
|---|---|---|---|---|
| 6,766,501 | B1* | 7/2004 | Duggirala et al. | 716/124 |
| 2006/0265681 | A1* | 11/2006 | Bakir et al. | 716/10 |
| 2007/0168899 | A1* | 7/2007 | Frenkil | 716/10 |
| 2008/0307280 | A1* | 12/2008 | Putman et al. | 714/727 |

* cited by examiner

*Primary Examiner* — Paul Dinh

(57) ABSTRACT

Aspects of the disclosure provide a method to design integrated circuit (IC) using power gating techniques. The method includes determining a placement of a plurality of power gating cells and at least a circuit block in an IC layout. On the IC layout, a first set of power gating cells and a second set of power gating cells are separated by the circuit block with a distance longer than a threshold. Further, the method includes optimizing a stitching order of the power gating cells for the placement to reduce a number of instances that the power gating cells in the first set and the power gating cells in the second set are neighboring power gating cells in the stitching order.

17 Claims, 11 Drawing Sheets

METHOD AND APPARATUS FOR POWER GATING STITCHING

INCORPORATION BY REFERENCE

This application claims the benefit of U.S. Provisional Application No. 61/116,496, "Power Gating Stitching Using Scan Reorder" filed on Nov. 20, 2008, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various electronic devices, such as portable devices, require low power consumption, e.g., to prolong a battery life. Generally, a portion of the power consumption is due to leakage power. To reduce leakage power, power gating techniques can be used in integrated circuit (IC) design.

SUMMARY

Aspects of the disclosure can provide a method to design integrated circuits using power gating techniques. The method for integrated circuit (IC) design includes determining a placement of a plurality of power gating cells and at least a circuit block in an IC layout. On the IC layout, a first set of power gating cells and a second set of power gating cells are separated by the circuit block with a distance longer than a threshold. Further, the method includes optimizing a stitching order of the power gating cells for the placement to reduce a number of instances that the power gating cells in the first set and the power gating cells in the second set are neighboring power gating cells in the stitching order.

In an embodiment, the method includes generating an initial stitching order. The initial stitching order is generated based on names of the power gating cells or based on an insertion sequence of the power gating cells.

To optimize the stitching order of the power gating cells, the method includes optimizing the stitching order of the power gating cells for the placement to reduce a number of neighboring power gating cells having a distance longer than the threshold.

Further, the method includes inserting a buffer between two neighboring power gating cells to transmit a control signal when the distance between the two neighboring power gating cells is longer than the threshold.

According to an aspect of the disclosure, the stitching order of the power gating cells can be optimized using a scan re-order tool that re-orders scan cells. More specifically, the method includes generating a placement file having scan cells. The scan cells are placed corresponding to the power gating cells, for example, at the same places as the power gating cells. Further, the method includes importing the placement file to the scan re-order tool to generate an order of the scan cells, and swapping the scan cells in the generated order with corresponding power gating cells to generate the stitching order. In an example, the scan re-order tool is IC Compiler from Synopsys.

Aspects of the disclosure can provide an integrated circuit (IC). The IC includes a first power net configured to receive power from a power source and distribute the received power in the IC. Further, the IC includes a second power net. The second power net is coupled to the first power net when the IC is in a first power mode, and decoupled from the first power net when the IC is in a second power mode. In addition, the IC includes power gating cells having switches gating between the first power net and the second power net. The power gating cells turn on the switches according to a stitching order when the IC is configured in the first power mode, and turn off the switches when the IC is configured in the second power mode. Further, the IC includes a circuit block. On the IC, the circuit block is situated at a place that separates a first set of power gating cells and a second set of power gating cells by a distance longer than a threshold. The stitching order is optimized based on the placement of the power gating cells and the circuit block to reduce a number of instances that the power gating cells in the first set and the power gating cells in the second set are neighboring power gating cells in the stitching order.

According to an aspect of the disclosure, the power gating cells can be header cells or footer cells.

Aspects of the disclosure also provide a computer readable medium storing program instructions for causing a processor to perform integrated circuit (IC) design steps. The IC design steps include determining a placement of power gating cells and at least a circuit block in an IC layout and optimizing a stitching order of the power gating cells for the placement. In the IC layout, a first set of power gating cells and a second set of power gating cells are separated by the circuit block with a distance longer than a threshold. The stitching order can be optimized to reduce a number of instances that the power gating cells in the first set and the power gating cells in the second set are neighboring power gating cells in the stitching order.

In an embodiment, the IC design steps further include generating a placement file having scan cells. The scan cells are placed corresponding to the power gating cells. Further, the IC design steps include importing the placement file to a scan re-order tool to generate an order of the plurality of scan cells, and swapping the scan cells in the generated order with corresponding power gating cells to generate the stitching order.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
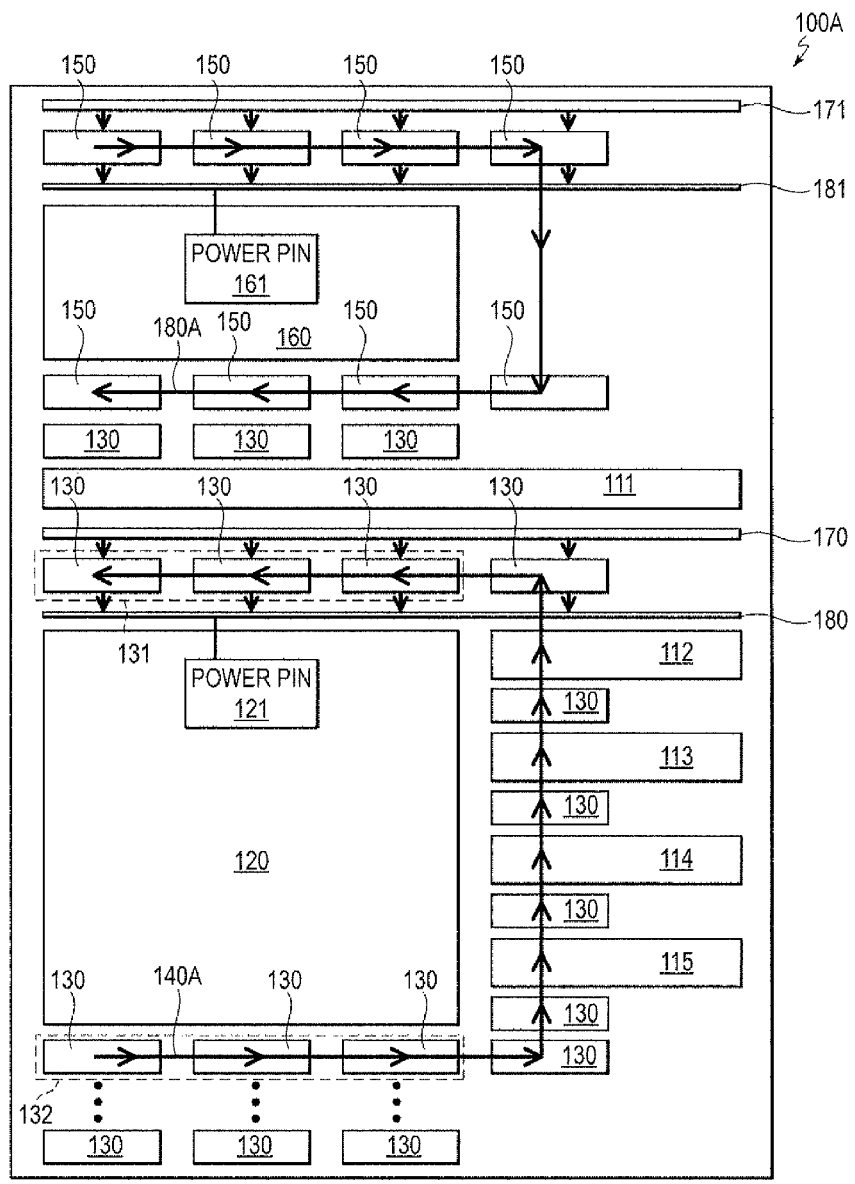
FIGS. 1A and 1B show integrated circuit layout examples according to an embodiment of the disclosure.

FIG. 1A shows a highly simplified layout example 100A of an integrated circuit (IC) according to an embodiment of the disclosure. The IC layout 100A includes various circuit components, such as a plurality of standard cell rows 111-115, a plurality of intellectual property (IP) blocks 120, a plurality of power gating cells 130, and the like. These circuit components are suitably placed in the IC layout 100A as shown in FIG. 1A. The placement of the various circuit components can be determined by any suitable IC design tool.

The plurality of standard cell rows 111-115 are used for placing standard cell instances. Generally, standard cells in a standard cell library have a same height, and their instances can be suitably put in the plurality of standard cell rows 111-115. In addition, the standard cell rows 111-115 generally have routing spaces, such as between two standard cell instances, that allow routing wires to cross. Each standard cell instance includes various pins, such as power pins, input/output (I/O) pins, and the like. The power pins are coupled to power nets to receive power for enabling operations of the standard cell instance.

The IP blocks 120 are pre-designed circuit blocks that are re-usable, such as memory circuit block, cryptographic circuit block, codec circuit block, and the like. The IP blocks 120 are generally of large sizes. For example, the heights of the IP blocks 120 are much larger than the height of the standard cell rows 111-115. In addition, the IP blocks 120 typically comprise custom circuit designs that have higher pattern densities compared to the standard cell rows 111-115. Generally, it is difficult to add more patterns, for example, corresponding to transistors, routing wires, and the like, in the IP blocks 120. Each of the IP blocks 120 also includes various pins, such as power pins 121, I/O pins (not shown), and the like. The power pins 121 are coupled to power nets to receive power for enabling operations of the IP blocks 120.

The plurality of power gating cells 130 are generally distributed in the IC layout 100A in a regular pattern, such as evenly spaced in X axis direction and Y axis direction, to form a distributed switch to turn on and off a power net. However, due to the relatively large sizes of the IP blocks 120, some power gating cells 130 are separated by relatively long distances. In FIG. 1A example, a first set of power gating cells 131 and a second set of power gating cells 132 are situated on opposite sides of an IP block 120. The distance between the first set of power gating cells 131 and the second set of power gating cells 132 is a function of the dimensions of the IP block 120.

The plurality of power gating cells 130 are coupled together in a serial chain according to a stitching order 140A. The stitching order 140A is optimized for the placement to facilitate further design steps, such as routing, and the like.

More specifically, in accordance with an embodiment of the disclosure, each of the plurality of power gating cells 130 includes one or more switches gating between a first power net 170 and a second power net 180. It is noted that the first power net 170 and the second power net 180 are infiltrated in the IC layout 100A. For ease and clarity, only a portion of the first power net 170 and the second power net 180 are shown in FIG. 1A as single lines.

The first power net 170 receives power from a power source, such as a battery pack, and the like, and distributes the power in the IC layout 100A. The second power net 180 is coupled to or decoupled from the first power net 170 based on the plurality of power gating cells 130. When the plurality of power gating cells 130 turn on their switches, the second power net 180 is coupled to the first power net 170, and thus the second power net 180 is powered up. When the plurality of power gating cells 130 turn off their switches, the second power net 180 is decoupled from the first power net 170, and thus the second power net 180 is powered down.

The plurality of power gating cells 130 turn on and off their switches based on a power mode of the IC. The IC can have multiple power modes, such as a first power mode having high power consumption, and a second power mode having low power consumption. In an example, the first power mode is an operation mode, and the second power mode is a sleep mode. To configure the IC into the first power mode, the plurality of power gating cells 130 turn on their switches. On the other hand, to configure the IC into the second power mode, the plurality of power gating cells 130 turn off their switches.

The various circuit components within the IC are suitably coupled to the first power net 170 or the second power net 180. For example, a cryptographic circuit block 120 used in a cell phone decrypts data received by the cell phone, or encrypts data to be transmitted by the cell phone. The cryptographic circuit block 120 does not operate when the cell phone is in the sleep mode. Thus, the power pin 121 of the cryptographic circuit block 120 can be coupled to the second power net 180. When the cell phone is in the operation mode, the plurality of power gating cells 130 turn on their switches. Thus, the second power net 180 is coupled to the first power net 170, and the cryptographic circuit block 120 operates normally. When the cell phone is in the sleep mode, the plurality of power gating cells 130 turn off their switches. Thus, the second power net 180 is decoupled from the first power net 170, and no leakage power is consumed by the cryptographic circuit block 120.

In another example, when a circuit block needs to operate in the sleep mode, the circuit block can be coupled to the first power net 170.

Generally, the plurality of power gating cells 130 are coupled in series according to a stitching order. Thus, the plurality of power gating cells 130 can turn on their switches in a time sequence based on the stitching order in response to a control signal, and thus reduce current stress to the power supply source. For example, the control signal is sent to a first power gating cell in the stitching order. The first power gating cell turns on a switch in response to the control signal, and forwards the control signal to a next power gating cell in the stitching order. Similarly, each power gating cell in the stitching order receives the control signal forwarded by a previous power gating cell, and turns on a switch in response to the control signal. Further, the power gating cell forwards the control signal to a next power gating cell in the stitching order. Thus, due to forwarding delays of the control signal, the plurality of power gating cells turn on the switches in a time sequence according to the stitching order.

According to an embodiment of the disclosure, the stitching order 140A is optimized based on the placement of the plurality of power gating cells 130 on the IC layout 100A to facilitate further design steps, such as routing, and the like. In an example, the stitching order 140A is optimized to reduce a distance between neighboring power gating cells. Neighboring power gating cells are coupled together by at least a wire for forwarding the control signal. When the distance between neighboring power gating cells is long, the wire for forwarding the control signal consumes a lot of routing resources. Further, when the distance between the neighboring power gating cells is longer than a threshold, buffers need to be inserted to ensure the control signal quality. As shown in FIG. 1A, power gating cells in the stitching order 140A forward the control signal to a nearby power gating cell, thus, no buffer insertion is necessary.

In an embodiment, an IC can include more than one switchable power nets that can be individually controlled. In FIG. 1A example, the IC layout 100A includes a third power net 171, a fourth power net 181, and a plurality of power gating cells 150 to provide power to an IP block 160. The third power net 171 receives power from the same power source as the first power net 170 or receives power from a different power source from the first power net 170. The plurality of power gating cells 150 form a distributed switch to gate between the third power net 171 and the fourth power net 181. The fourth power net 181 is powered up or powered down based on the plurality of power gating cells 150. The IP block 160 includes power pins 161 to receive power from the fourth power net 181.

The plurality of power gating cells 150 are coupled together according to a stitching order 180A, and can be switched on and off according to the stitching order 180A based on a control signal. The control signal to control the plurality of power gating cells 150 can be different from the control signal to control the plurality of power gating cells 130. In an example, the control signal for the plurality of power gating cells 150 keeps turning on the plurality of power gating cells 150 in the sleep mode. Thus, the IP block 160 operates normally in the sleep mode.

Figure 1B:
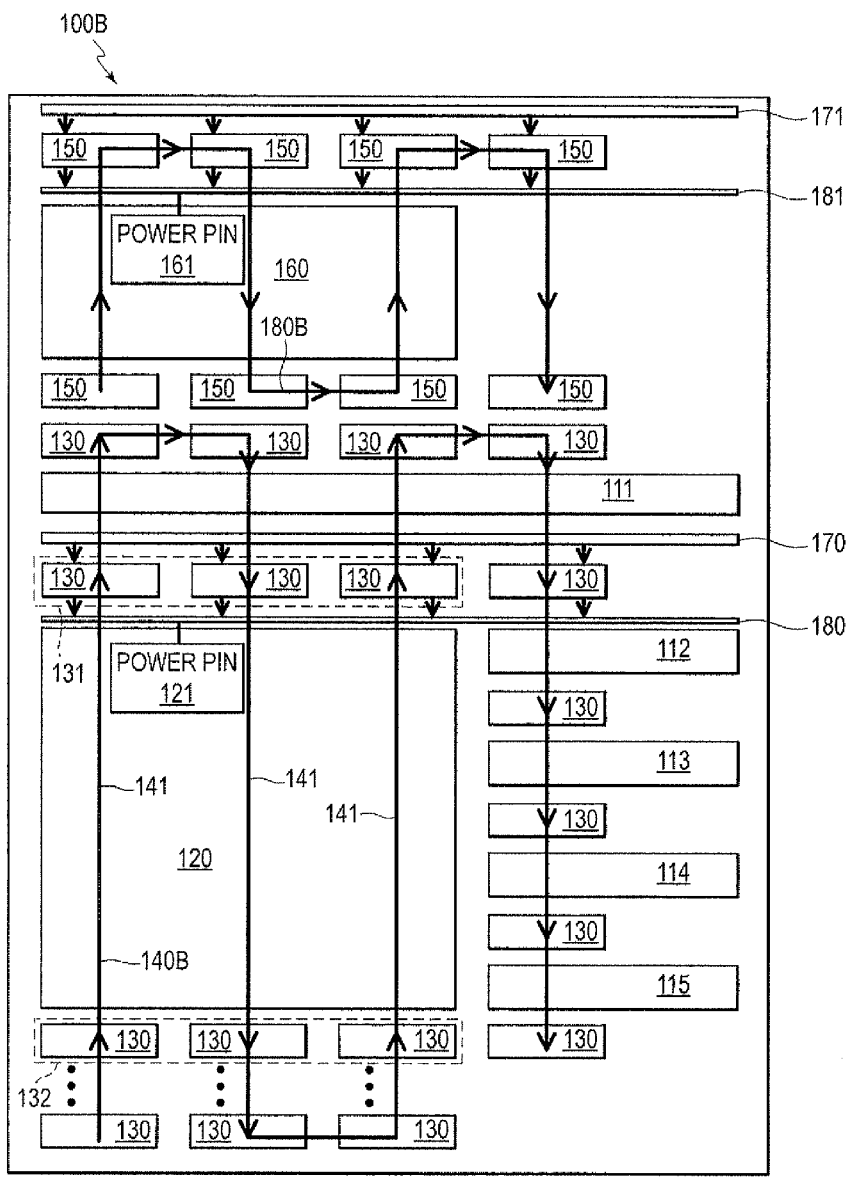

FIG. 1B shows another stitching order example 140B of the plurality of power gating cells 130, and another stitching order example 180B of the plurality of power gating cells 150. The stitching order 140B is formed based, for example, on a naming sequence of the plurality of power gating cells 130 or an insertion sequence of the plurality of power gating cells 130. Similarly, the stitching order 180B is formed based on a naming sequence or an insertion sequence of the plurality of power gating cells 150. Distances between some neighboring power gating cells can be long. For example, the stitching order 140B includes several instances 141 in which the first set of power gating cells 131 and the second set of power gating cells 132 are neighboring power gating cells. Due to the reason that the height (in the orientation depicted) of the IP block 120 is relatively large, the distances between the first set of power gating cells 131 and the second set of power gating cells 132 are large. When the distances are larger than a threshold, buffers need to be inserted for each of the instances 141 to ensure the control signal forwarding quality. Further, the buffers need to be coupled to the first power net 170 for operation. However, the IP block 120 may be powered up by the second power net 180. Thus, routings for the buffers, such as power net routings, wire routings for forwarding the control signal, can be difficult to achieve, and can consume a lot of design time and effects.

In contrast, the stitching order 140A in FIG. 1A reduces the number of instances that the first set of power gating cells 131 and the second set of power gating cells 132 are neighboring power gating cells. Thus, further design steps, such as routings, and the like, are easier to achieve based on the stitching order 140A, and consume less design time and effects.

It is noted that the first set of power gating cells 131 and the second set of power gating cells 132 can be separated by one or more IP blocks 120, and can be separated in any direction, such as X axis direction, Y axis direction, and the like.

It is also noted that the plurality of power gating cells 130 can be header cells for controlling high voltage power net and can be footer cells for controlling low voltage power net, such as ground net.

Figure 2:
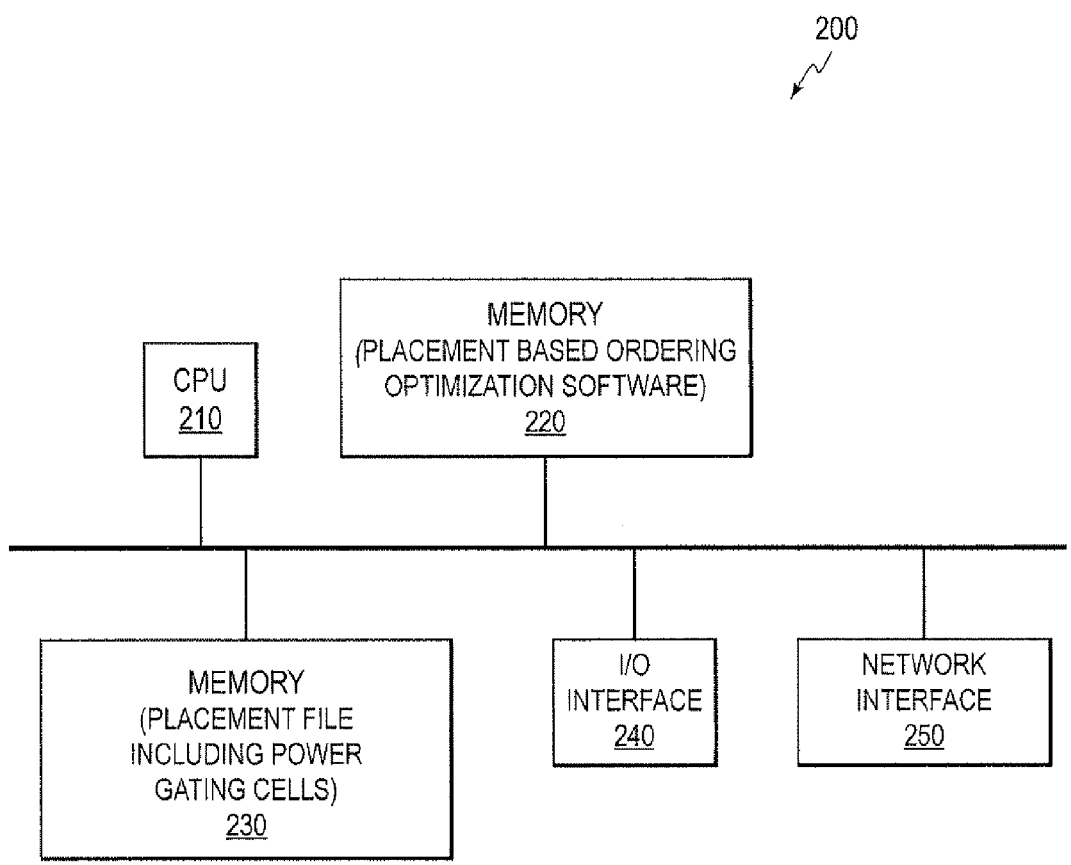
FIG. 2 shows a block diagram of a circuit design system according to an embodiment of the disclosure.

FIG. 2 shows a block diagram of a circuit design system example 200 according to an embodiment of the disclosure. The circuit design system 200 includes various components, such as a processor module 210, a first memory module 220, a second memory module 230, a user input and output (I/O) interface module 240, a network interface module 250, and the like. These elements are coupled together as shown in FIG. 2.

The processor module 210 executes system and application codes. More specifically, the processor module 210 executes system codes, such as operating system codes, file management codes, and the like, to maintain an appropriate status of the circuit design system 200. Further, the processor module 210 executes application codes to control the circuit design system 200 to perform specific functions. For example, the processor module 210 executes codes for performing a placement-based ordering optimization of power gating cells.

It is noted that the processor module 210 may include one or more processors for performing the required functions. The processors can be coupled together within a computer, or can be distributed in multiple computers and coupled together, for example, via a network, so that several designers may each work in a distributed manner on different parts of a complex circuit design.

The second memory module 230 stores a placement file. The placement file includes placements of power gating cells. In addition, the placement file includes placement of other circuit components, such as IP blocks, standard cell rows, and the like. The placement file can be imported from other design system, or can be generated within the circuit design system 200.

The first memory module 220 stores a software module for placement-based ordering optimization. The software module can be customized for optimizing an order of the power gating cells, or can be a commercially available software package. In an embodiment, the commercially available software package is originally designed for other purposes, such as ordering optimization for scan cells, and the like. In an example, the software module is part of IC compiler from Synopsys. It is noted that the software module may come from similar products of other electronic design automation (EDA) companies, such as Mentor, Magma, and the like.

The software module for placement-based ordering optimization can be executed by the processor module 210 to generate a stitching order of a plurality of power gating cells based on the placement of the plurality of power gating cells on a layout. In addition, the stitching order may be generated based on the placement of other circuit components, such as IP blocks, on the layout.

It is noted that the circuit design system 200 may include other design software modules to perform other design steps. In an example, the circuit design system 200 includes a placement module that determines the placement of the plurality of power gating cells and other circuit components in the layout.

In another example, the circuit design system 200 includes a routing software module that routes wires in the layout to connect the plurality of power gating cells in series based on the optimized stitching order.

In another example, the circuit design system 200 includes a verification software module that checks the layout for wire length violations and corrects the violations. For example, the verification software module can determine wires that are longer than a threshold, and add buffers in those wires.

According to an embodiment of the disclosure, the optimized stitching order can facilitate other design steps, such as the routing step, the violation checking and correcting step, and the like. For example, the stitching order can be optimized for the placement to reduce a distance between neighboring power gating cells, such that fewer wires are longer than the threshold, and fewer buffers need to be inserted.

It is noted that the first memory module 220 and the second memory module 230 can be any suitable memory devices, such as semiconductor memory devices, magnetic storage media, optical storage media, and the like. In addition, the first memory module 220 and the second memory module 230 can be a same memory device, or can be different memory devices.

The user I/O interface module 240 couples various user input and output devices, such as display, keyboard, mouse, and the like, to the circuit design system 200. The output devices provide circuit design outputs, such as locations of the plurality of power gating cells, a stitching order of the plurality of power gating cells, and the like to users. The input devices enable the users to instruct the circuit design system 200, and control the processor module 210 to execute, for example, the software module of the placement based ordering optimization.

The network interface module 250 couples the circuit design system 200 to other device and system. In an example, the network interface module 250 couples the circuit design system 200 to a partition and placement system (not shown). The partition and placement system partitions a logic design into circuit blocks, places the circuit blocks in a layout, for example, in the form of standard cell rows and IP blocks. In addition, the partition and placement system inserts power gating cells in the layout at suitable places. The placement information of the layout is then provided to the circuit design system 200 via the network interface module 250.

In another example, the network interface module 250 couples the circuit design system 200 to a database server (not shown). The database server stores various information, such as standard cell libraries, IP block layouts, placements, and the like. The circuit design system 200 accesses the database server to obtain necessary information.

It is noted that the partition and placement system, the database server, and the like, can be suitably configured as individual systems, or can be suitably configured to be part of the circuit design system 200.

Figure 3:
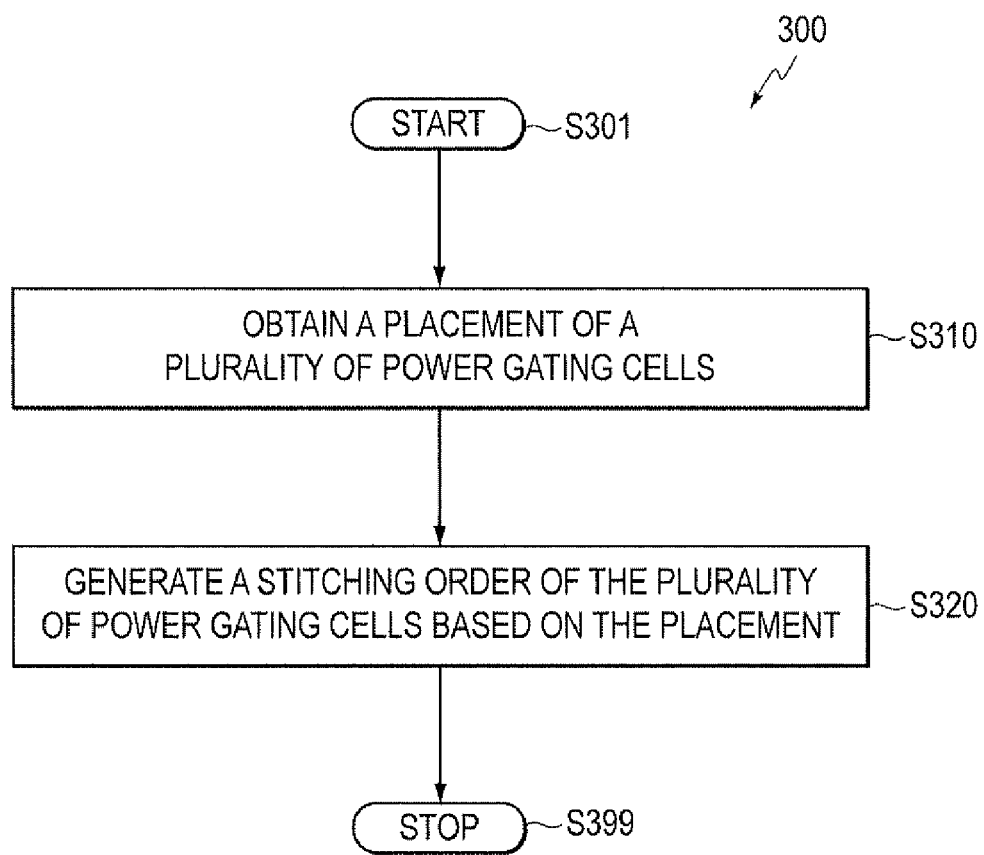
FIG. 3 shows a flow chart outlining a process example for generating a stitching order for a plurality of power gating cells according to an embodiment of the disclosure.

FIG. 3 shows a flow chart outlining a process example 300 performed by a circuit design system according to an embodiment of the disclosure. In an example, the circuit design system includes a software module for ordering power gating cells based on placement of the power gating cells. The process starts at S301 and proceeds to S310.

At S310, the circuit design system obtains a placement of a plurality of power gating cells. In an example, the circuit design system includes a placement tool that inserts and places the plurality of power gating cells in a layout. In accordance with an embodiment, the layout includes other circuit components, such as standard cells, IP blocks, and the like. In another example, the circuit design system imports a placement file from another design system. The placement file includes placement information of the plurality of power gating cells. In addition, in accordance with an embodiment, the placement file includes placement information of other circuit components, such as standard cells, IP blocks, and the like.

At S320, the circuit design system generates a stitching order of the plurality of power gating cells based on the given placement information of the plurality of power gating cells. In an example, a processor module executes the software module for ordering power gating cells based on placement, and generates the stitching order. In accordance with an embodiment, the stitching order is then provided to other circuit design modules, such as a routing module, a verification and correction module, and the like, to continue the circuit design. The process then proceeds to S399, and terminates.

Figure 4:
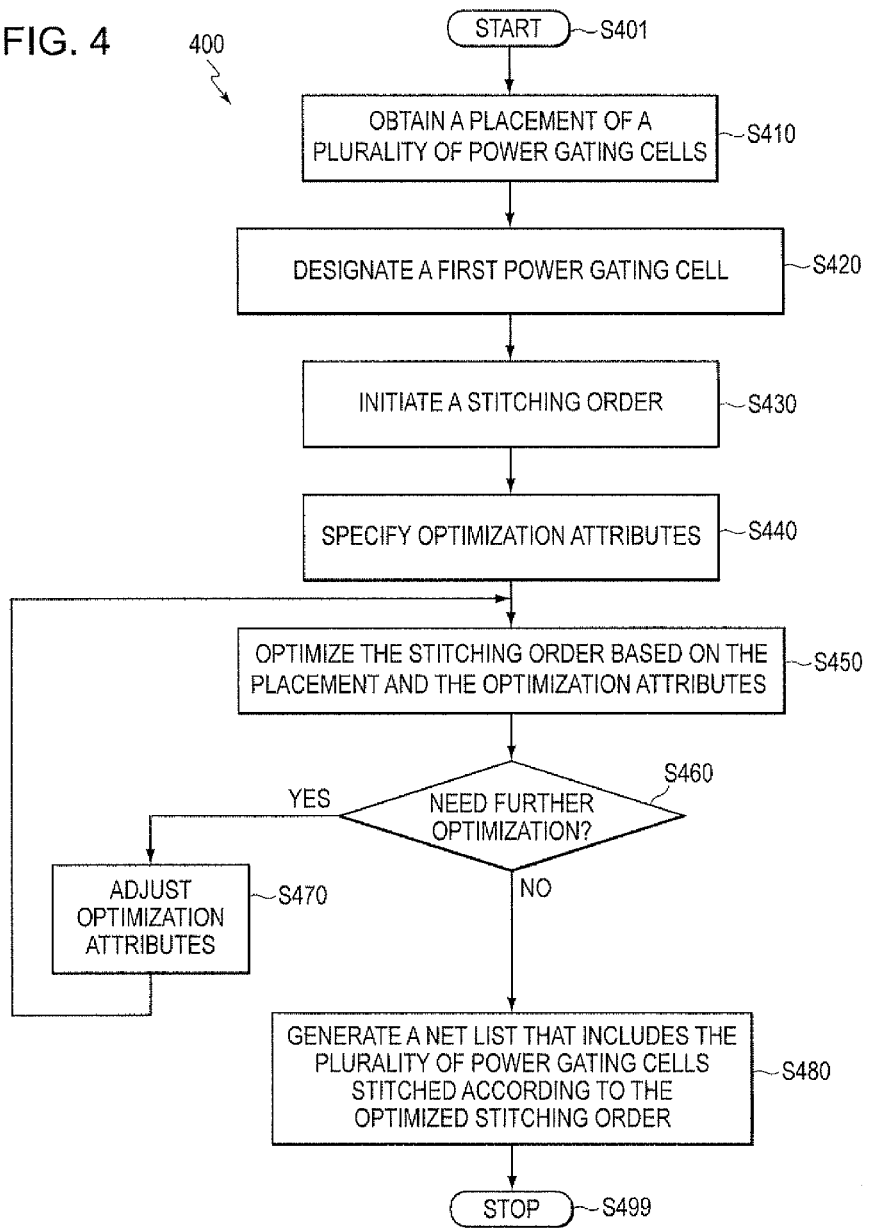
FIG. 4 shows a flow chart outlining another process example for generating a stitching order for a plurality of power gating cells according to an embodiment of the disclosure.

FIG. 4 shows another flow chart outlining a process example 400 performed by a circuit design system according to an embodiment of the disclosure. The process starts at S401 and proceeds to S410.

At S410, the circuit design system obtains a placement of a plurality of power gating cells. In an example, the circuit design system includes a placement tool that inserts and places the plurality of power gating cells in a layout. The layout can include other circuit components, such as standard cells, IP blocks, and the like. In another example, the circuit design system imports a placement file from another design system. The placement file includes placement information of the plurality of power gating cells. In addition, in accordance with an embodiment, the placement file includes placement information of other circuit components, such as standard cells, IP blocks, and the like.

At S420, the circuit design system designates a first power gating cell to start a stitching order. The circuit design system designates the first power gating cell based on various information, such as power net distribution, the circuit block that originates the control signal to the power gating cells, and the like. It is noted that the first power gating cell can be determined using any suitable methodology.

At S430, the circuit design system generates an initial stitching order that starts with the first power gating cell. In an example, the initial stitching order is generated based on the naming of the plurality of power gating cells.

At S440, the circuit design system specifies optimization attributes. In an embodiment, the circuit design system receives instructions from a designer, and specifies the optimization attributes based on the instructions. For example, in accordance with an embodiment, the designer instructs the circuit design system to minimize distances along X axis direction of neighboring power gating cells. In another example, the designer instructs to minimize distances along Y axis direction of neighboring power gating cells. In another example, the designer instructs to minimize a number of instances that distances between neighboring power gating cells are longer than a threshold. In addition, the designer may input parameters for optimization, such as a threshold for distance along Y axis direction, a threshold for distance along X axis direction, weights for a cost function, and the like.

At S450, the circuit design system optimizes the stitching order based on the placement and the optimization attributes. The circuit design system can use any suitable algorithm to optimize the stitching order, such as annealing, divide and conquer, and the like.

At S460, the circuit design system determines whether further optimization is needed. In an example, the circuit design system provides the stitching order to the designer, the designer gives instructions based on the provided stitching order. The circuit design system determines further optimization based on the instructions. In another example, the circuit design system includes a verification module. The verification module determines possible violations, and may evaluate ease of further design steps based on the optimized stitching order. Then, the circuit design system makes decision based on the information provided by the verification module. When the circuit design system determines further optimization is needed, the process proceeds to S470; otherwise, the process proceeds to S480.

At S470, the circuit design system adjusts the optimization attributes. In an embodiment, the circuit design system receives instructions from the designer to optimize the stitching order from another aspect. For example, the designer may first instruct to optimize the initial stitching order to reduce distance along Y axis direction between neighboring power gating cells, and then instruct to optimize the stitching order obtained from the first optimization to reduce distance along X axis direction between the neighboring power gating cells. The process then returns to S450.

At S480, the circuit design system generates a net list that includes the plurality of power gating cells. The plurality of power gating cells are coupled together in the net list based on the optimized stitching order. The net list can be used in further circuit design steps, such as routing, and the like. The process then proceeds to S499, and terminates.

It is noted that the steps in the process 400 can be suitably adjusted. In an example, S430 is removed. In another example, the first power gating cell is an optimization attribute that can be changed during the optimization process 400.

Figure 5:
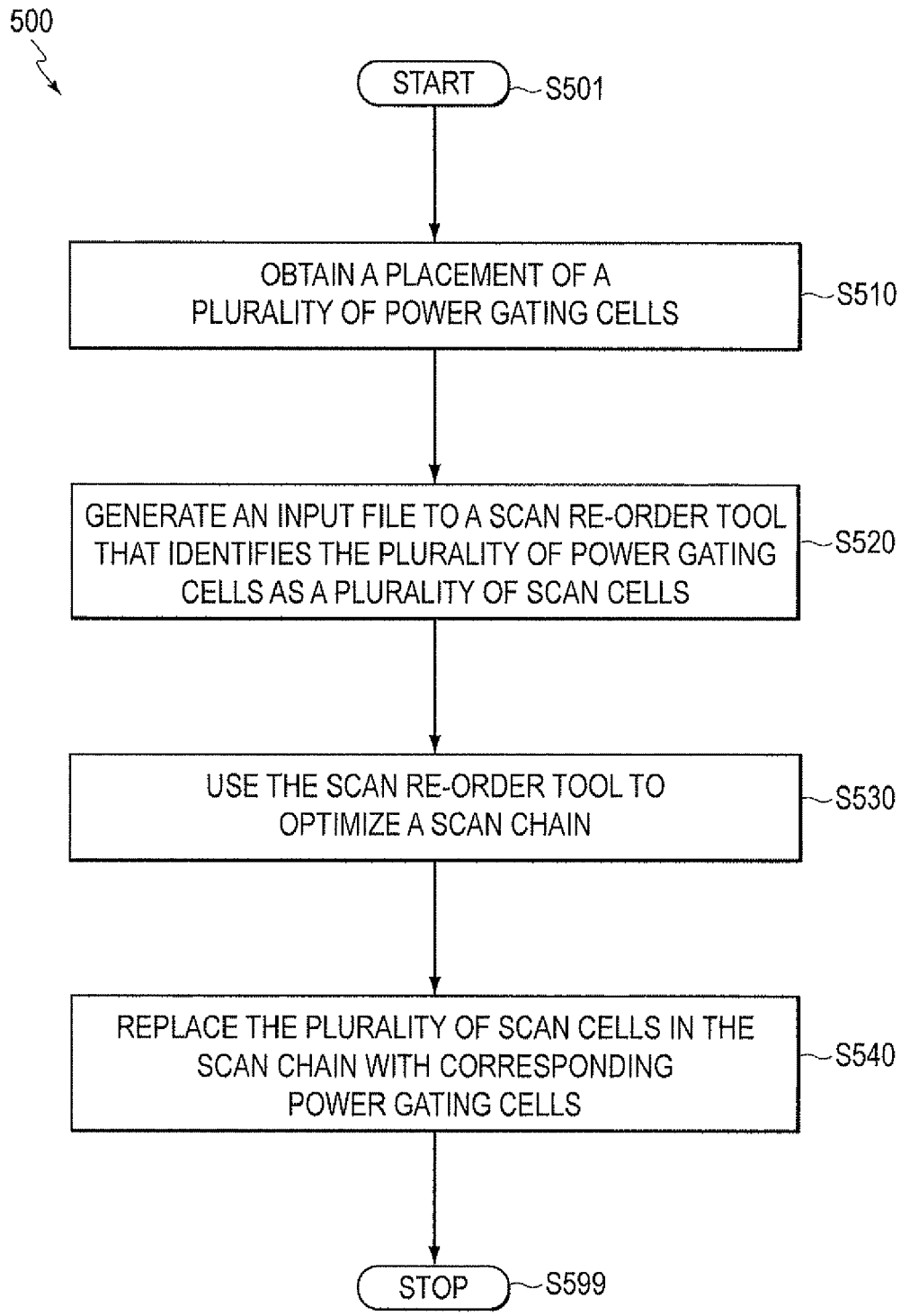
FIG. 5 shows a flow chart outlining another process example for generating a stitching order for a plurality of power gating cells according to an embodiment of the disclosure.

FIG. 5 shows another flow chart outlining a process example 500 performed by a circuit design system according to an embodiment of the disclosure. The process starts at S501, and proceeds to S510.

At S510, the circuit design system obtains a placement of a plurality of power gating cells. In an example, the circuit design system includes a placement tool that inserts and places the plurality of power gating cells in a layout. The layout can include other circuit components, such as standard cells, IP blocks, and the like. In another example, the circuit design system imports a placement file from another design system. The placement file includes placement information of the plurality of power gating cells. In addition, the placement file can include placement information of other circuit components, such as standard cells, IP blocks, and the like.

At S520, the circuit design system generates an input file for a scan re-order tool. The input file is generated based on the placement of the plurality of power gating cells. The input file includes a plurality of scan cells, and each scan cell corresponds to a power gating cell in the placement. In an example, the circuit design system modifies a description portion of a placement file for the plurality of power gating cells, for example, changing cell description from power gating cell to scan cell.

At S530, the circuit design system provides the input file to the scan re-order tool to generate a scan chain that couples the plurality of scan cells in series. In an example, the scan re-order tool is IC Compiler from Synopsys. It is noted that other scan re-order tools from other companies, such as Magma, Mentor, and the like, can be used as well.

At S540, the circuit design system replaces the scan cells in the scan chain with corresponding power gating cells. The process proceeds to S599, and terminates.

Figure 6A:
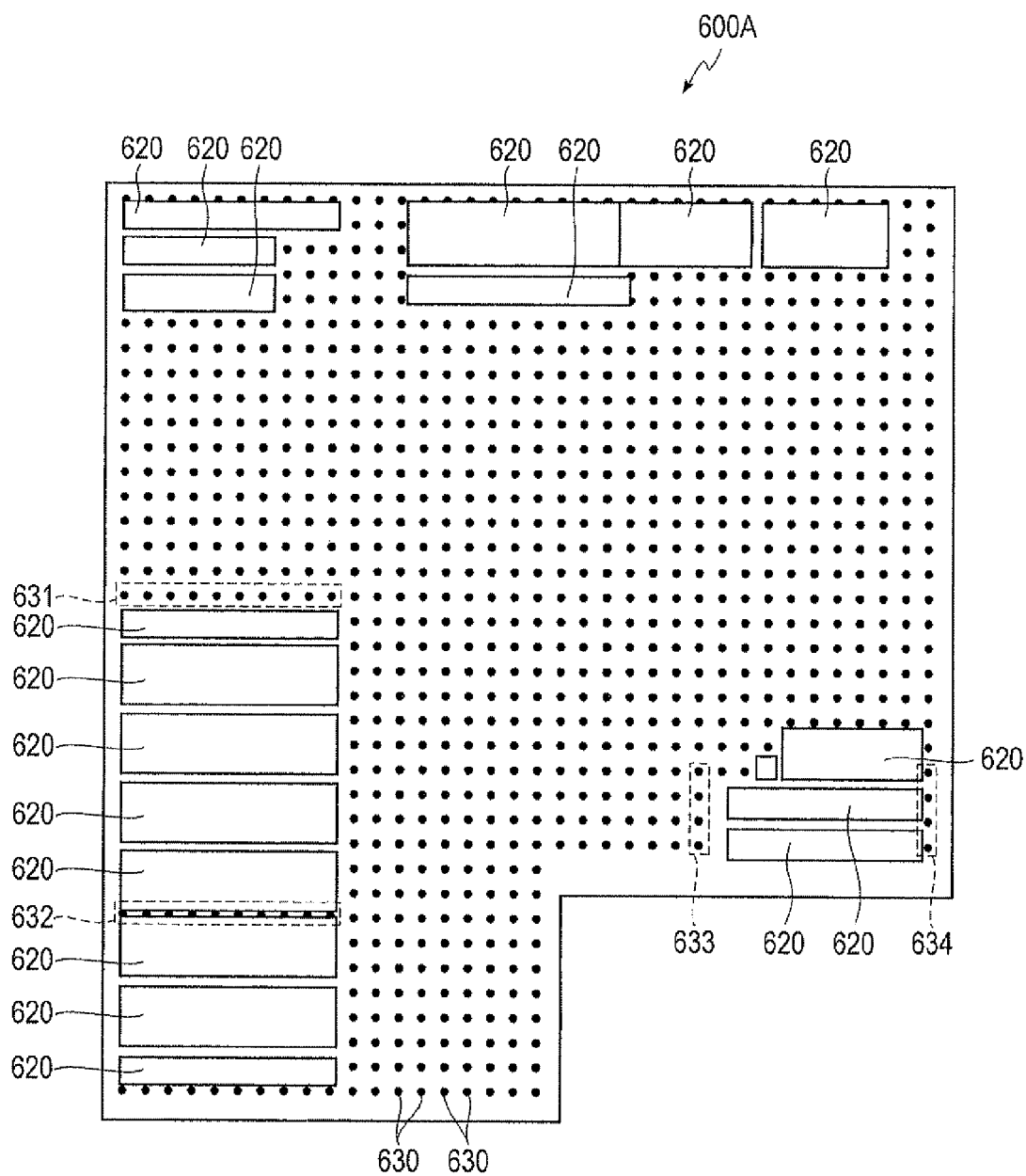
FIGS. 6A-6C show integrated circuit layout examples according to an embodiment of the disclosure.

FIG. 6A shows a layout example 600A of an IC according to an embodiment of the disclosure. The IC layout 600A corresponds to an IC block in an IC chip. The IC layout 600A includes various circuit components, such as IP blocks 620, power gating cells 630, standard cell rows (not shown), power nets (not shown), and the like. The power gating cells 630 are distributed in the IC layout 600A in a regular pattern. However, the IP blocks 620 isolate the power gating cells 630. For example, a first set of power gating cells 631 and a second set of power gating cells 632 are separated in Y axis direction by several IP blocks 620, and a third set of power gating cells 633 and a fourth set of power gating cells 634 are separated in X axis direction by several IP blocks 620. The placement of the various circuit components can be determined by any suitable IC design tool.

Figure 6B:
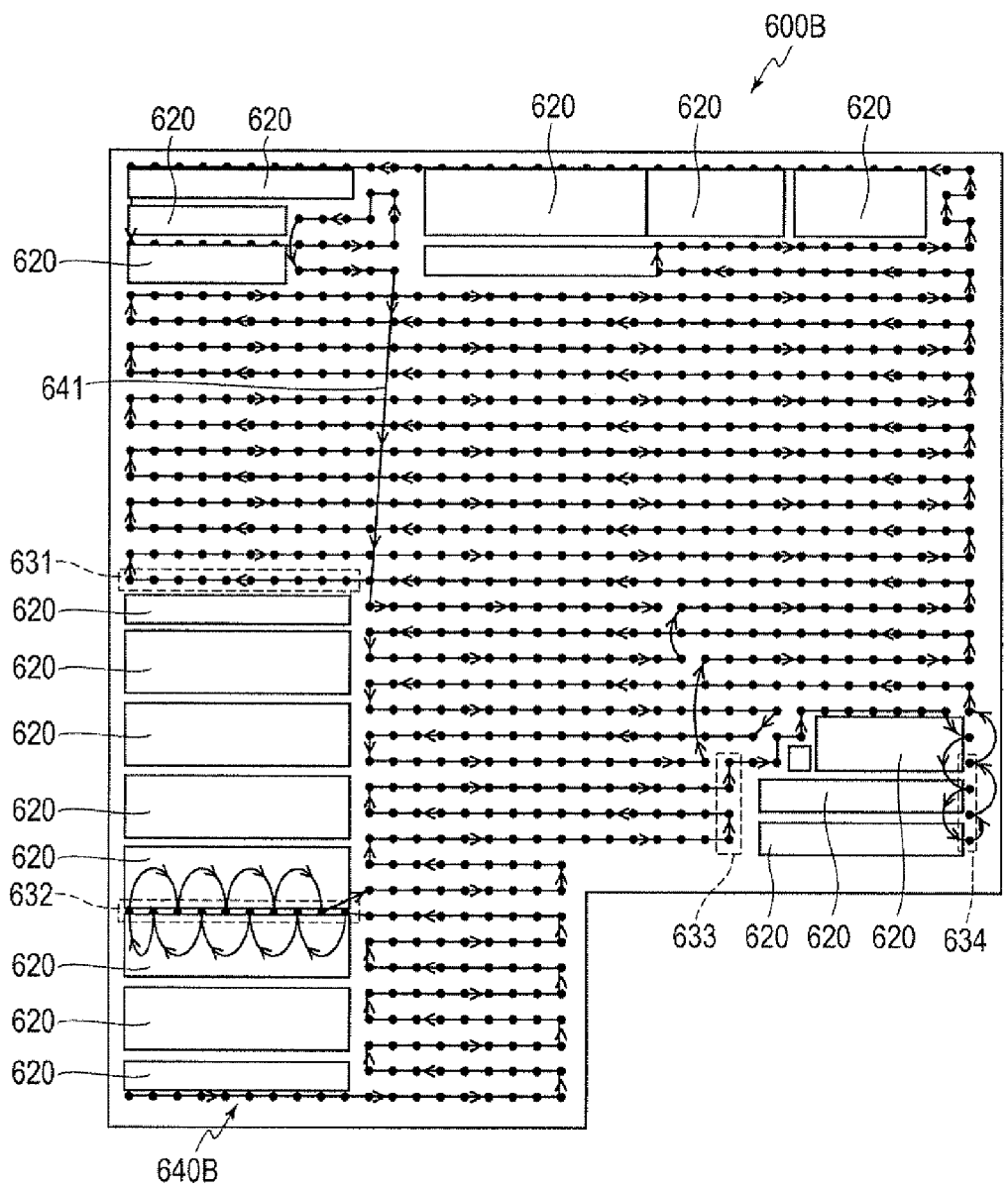

FIG. 6B shows a layout example 600B corresponding to the same IC as 600A. The IC layout 600B shows a stitching order 640B. The stitching order 640B is generated based on the placement of the power gating cells 630. As shown in FIG. 6B, the IC layout 600B has a small number of instances 641 having long distance between neighboring power gating cells. For example, the first set of power gating cells 631 do not neighbor with the second set of power gating cells 632 in the stitching order 640B, and the third set of power gating cells 633 do not neighbor with the fourth set of power gating cells 634 in the stitching order 640B.

Figure 6C:
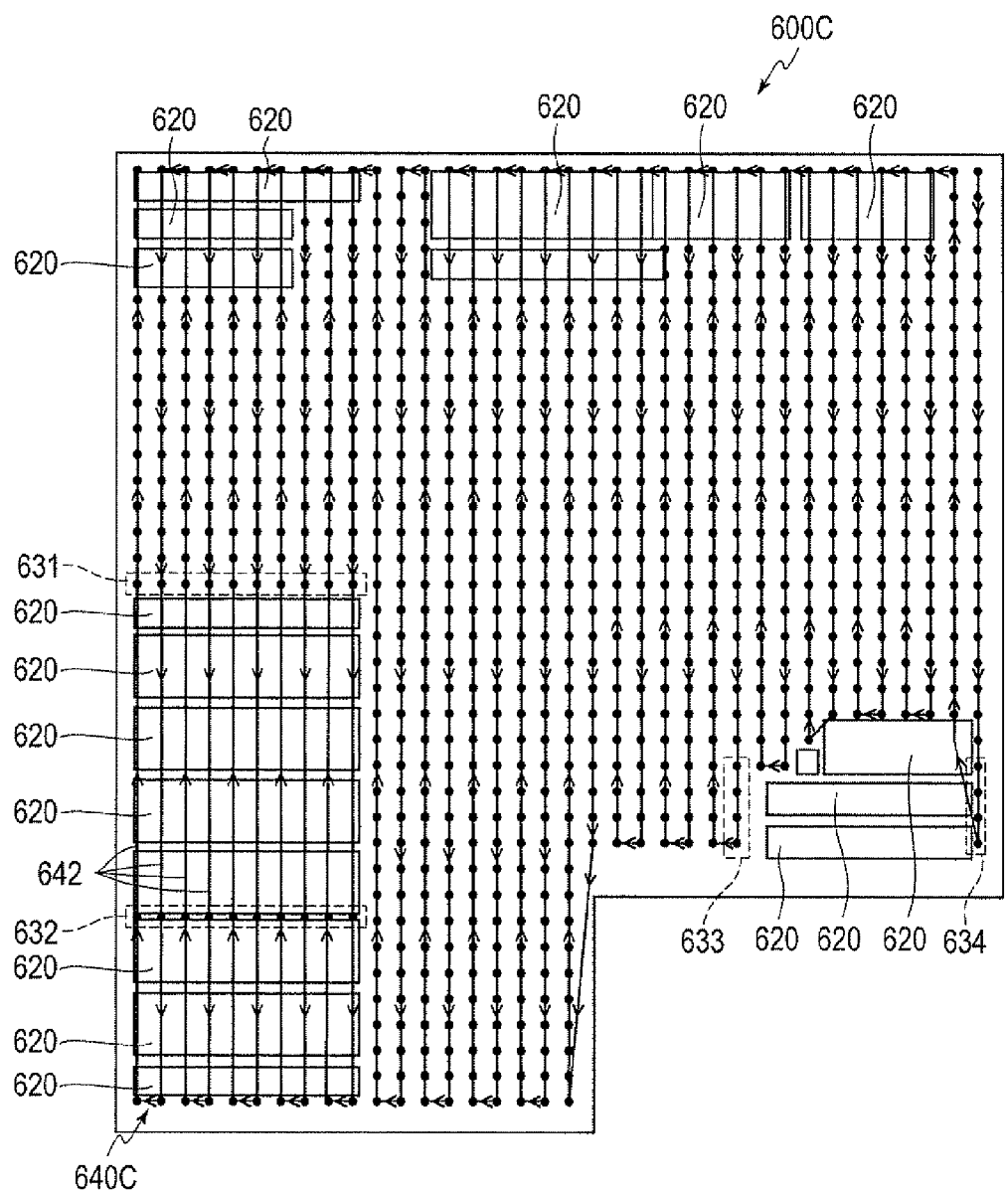

FIG. 6C shows another layout example 600C corresponding to the same IC as 600A. The IC layout 600C shows a stitching order 640C. The stitching order 640C is generated based on a naming sequence of the power gating cells 630 and is not optimized. As shown in FIG. 6C, the IC layout 600C has a large number of instances 642 having long distance between neighboring power gating cells in the stitching order 640C. For example, the first set of power gating cells 631 neighbor with the second set of power gating cells 632 in the stitching order 640C. Thus, a large number of buffers need to be inserted where stitching between neighboring power gating cells traverses one or more IP blocks 620, and routings for the large number of buffers consume design time and efforts.

Figure 7:
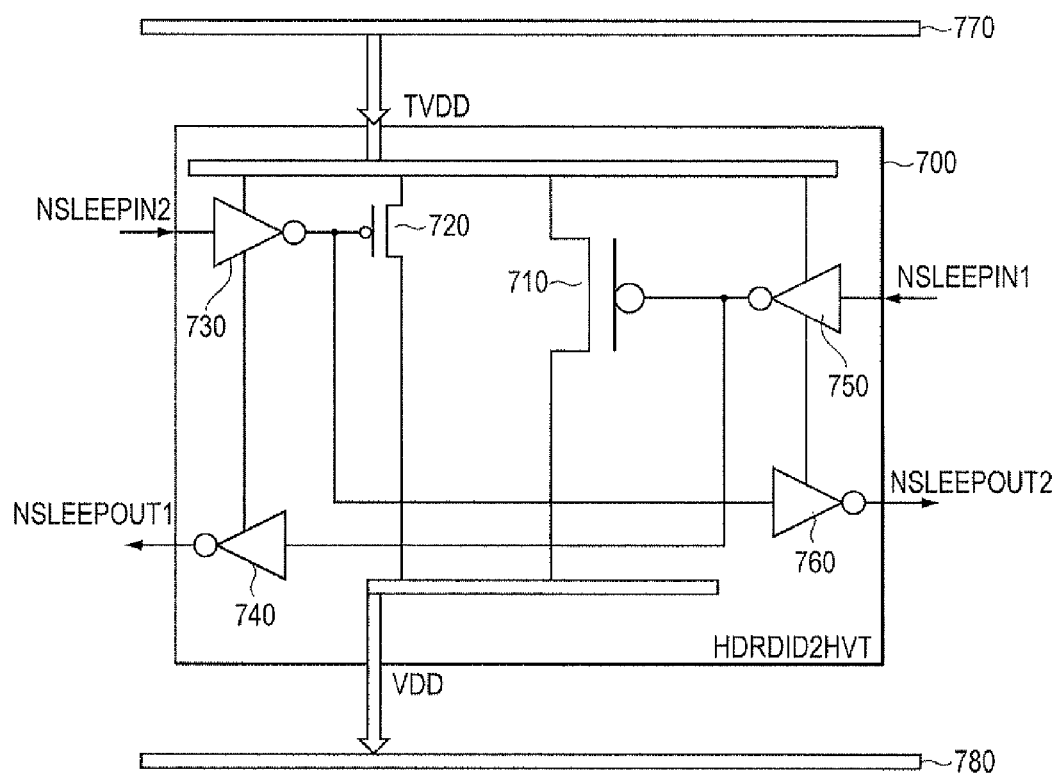
FIG. 7 shows a circuit diagram of a power gating cell example according to an embodiment of the disclosure.

FIG. 7 shows a circuit diagram of a power gating cell example 700 between a first power net 770 and a second power net 780 according to an embodiment of the disclosure. The power gating cell 700 includes a first switch 710, a second switch 720 and inverters 730-760. These elements are coupled together as shown in FIG. 7.

The first power net 770 is coupled to a power source, such as a battery pack, and the like. The second power net 780 is coupled to circuits that can be powered off in a power saving mode to reduce leakage power consumption.

The first switch 710 and the second switch 720 control a current path between the first power net 770 and the second power net 780. When the first switch 710 and/or the second switch 720 are turned on, the second power net 780 is coupled to the first power net 770 via the current path. Then, current flows to the second power net 780 to power up the second power net 780. Thus, the circuits coupled to the second power net 780 can operate normally. When the first switch 710 and the second switch 720 are both turned off, the second power net 780 is decoupled from the first power net 770. Thus, the circuits coupled to the second power net 780 are powered off to reduce leakage power consumption.

In an embodiment, the first switch 710 and the second switch 720 are of different current driving strengths. In FIG. 7 example, the first switch 710 is a p-type metal-oxide-semiconductor (PMOS) transistor having a larger width/length ratio, and can be refereed as a mother switch. The second switch 720 is a PMOS transistor having a smaller width/length ratio, and can be refereed as a daughter switch.

The inverters 730-760 provide suitable logic to turn on and off the first switch 710 and the second switch 720 in response to a control signal, and forward the control signal to a next power gating cell. The inverters 730-760 are coupled to the first power net 770 to operate in the power saving mode.

The power gating cell 700 has a first control signal input NSLEEPIN1, and a second control signal input NSLEEPIN2. The power gating cell 700 turns on and off the first switch 710 in response to the first control signal input NSLEEPIN1, and turns on and off the second switch 720 in response to the second control signal input NSLEEPIN2. In addition, the power gating cell 700 forwards a first control signal output NSLEEPOUT1 in response to the first control signal input NSLEEPIN1, and forwards a second control signal output NSLEEPOUT2 in response to the second control signal input NSLEEPIN2. In an example, the first control signal output NSLEEPOUT1 corresponds to the first control signal input NSLEEPIN1 with a delay, and the second control signal output NSLEEPOUT2 corresponds to the second control signal input NSLEEPIN2 with a delay.

Figure 8:
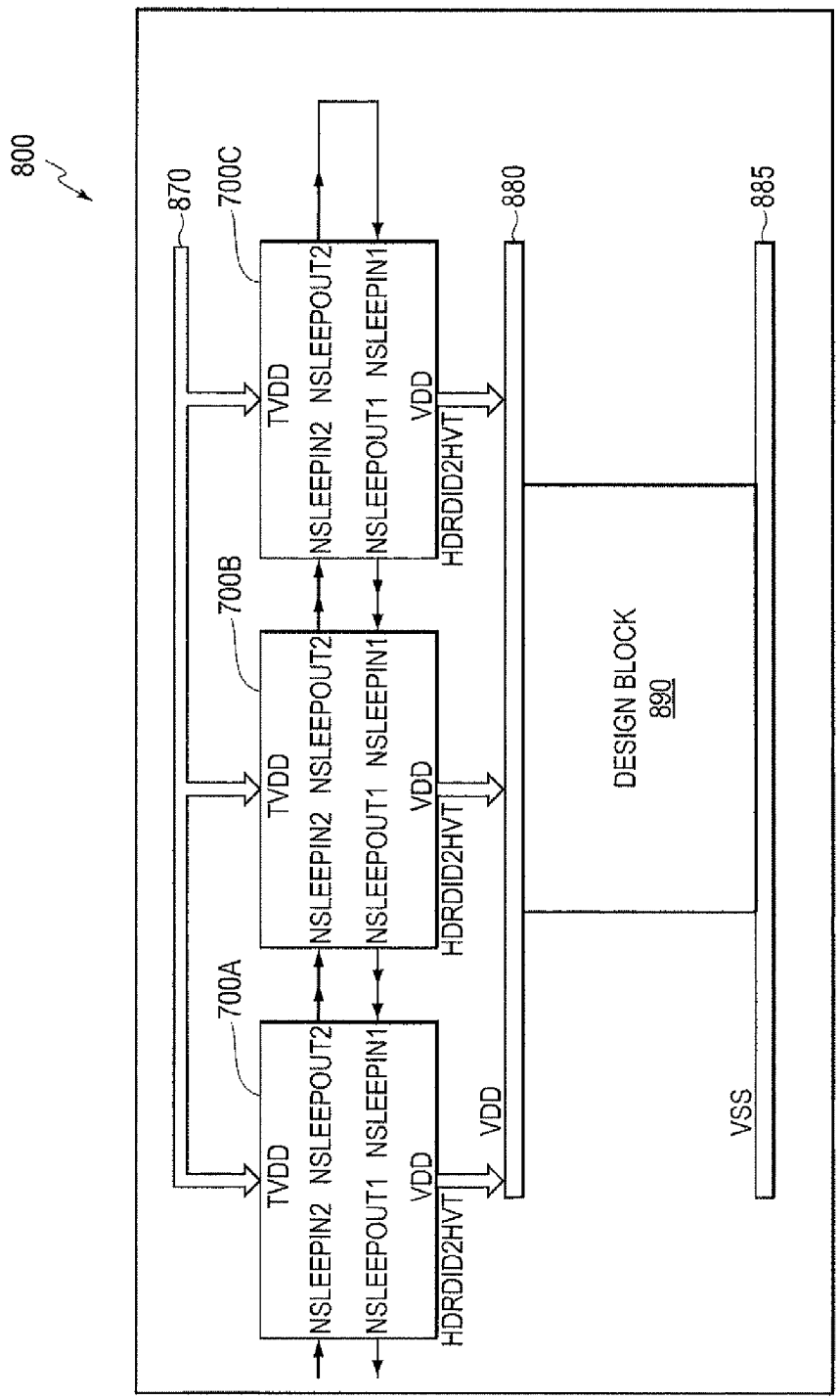
FIG. 8 shows a block diagram of a power gated circuit example 800 according to an embodiment of the disclosure.

FIG. 8 shows a block diagram of a power gated circuit example 800 according to an embodiment of the disclosure. The power gated circuit 800 includes a first power net 870, a second power net 880, a ground net 885, a circuit block 890, and a plurality of power gating cells 700A-700C. These elements can be coupled together as shown in FIG. 8.

The first power net 870 is coupled to a power source, such as a battery pack, and the like. The second power net 880 is coupled to circuits, such as the circuit block 890, that can be powered off in a power saving mode to reduce leakage power consumption. The plurality of power gating cells 700A-700C include switches that gate current between the first power net 870 and the second power net 880. The ground net 885 is coupled to ground.

The circuit block 890 is coupled to the second power net 880 and the ground net 885. When the plurality of power gating cells 700A-700C turn on their switches, the second power net 880 is coupled to the first power net 870 to power up the circuit block 890. When the plurality of power gating cells 700A-700C turn off their switches, the second power net 880 is decoupled from first power net 870 to power off the circuit block 890 to reduce leakage power consumption.

The plurality of power gating cells 700A-700C are instances of the power gating cell 700, and are coupled in series as shown in FIG. 8. Thus, the switches within the plurality of power gating cells 700A-700C can be turned on in a time sequence to reduce current stress to the power supply source. In FIG. 8 example, the switch-on sequence is the second switch of the power gating cell 700A, the second switch of the power gating cell 700B, the second switch of the power gating cell 700C, the first switch of the power gating cell 700C, the first switch of the power gating cell 700B, and the first switch of the power gating cell 700A.

While the invention has been described in conjunction with specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for integrated circuit (IC) design, comprising:
Determining by a processor a placement of a plurality of power gating cells and at least a circuit block in an IC layout, a first set of power gating cells and a second set of power gating cells being separated by the circuit block with a distance longer than a threshold; and
optimizing a stitching order of the plurality of power gating cells for the placement to reduce a number of instances that the power gating cells in the first set and the power gating cells in the second set are neighboring power gating cells in the stitching order, the stitching order being an order of sequence by which a power gating cell turns on its switch and forwards its control signal to a next power gating cell to turn on power gating cells in a time sequence.

2. The method of claim 1, further comprising:
generating an initial stitching order.

3. The method of claim 1, wherein determining the placement of the power gating cells in the IC layout, further comprises at least one of:
determining a placement of header cells in the IC layout; and
determining a placement of footer cells in the IC layout.

4. The method of claim 1, wherein optimizing the stitching order of the power gating cells for the placement to reduce the number of instances that the power gating cells in the first set and the power gating cells in the second set are neighboring power gating cells in the stitching order, further comprises:
optimizing the stitching order of the power gating cells for the placement to reduce a number of neighboring power gating cells having a distance longer than the threshold.

5. The method of claim 1, wherein optimizing the stitching order of the power gating cells for the placement to reduce the number of instances that the power gating cells in the first set and the power gating cells in the second set are neighboring power gating cells in the stitching order, further comprises:
optimizing the stitching order using a scan re-order hardware tool that re-orders scan cells.

6. The method of claim 5, wherein optimizing the stitching order by the scan re order tool that re-orders scan cells further comprises:
generating a placement file having scan cells, the scan cells being placed corresponding to the power gating cells;
importing the placement file to the scan re-order tool to generate an order of the scan cells; and
swapping the scan cells in the generated order with corresponding power gating cells to generate the stitching order.

7. The method of claim 6, wherein optimizing the stitching order by the scan re order tool that re-orders scan cells based on the placement of the scan cells further comprises:
optimizing the stitching order by IC compiler.

8. An integrated circuit (IC), comprising:
a first power net configured to receive power from a power source and distribute the received power in the IC;
a second power net coupled to the first power net when the IC is in a first power mode, and decoupled from the first power net when the IC is in a second power mode;
a plurality of power gating cells placed in the IC, the plurality of power gating cells having switches selectively gating between the first power net and the second power net and being configured to be activated or deactivated according to a stitching order when the IC changes a power mode; and
a circuit block separating a first set of power gating cells and a second set of power gating cells by a distance longer than a threshold, wherein the stitching order is optimized for a placement of the power gating cells to reduce a number of instances that the power gating cells in the first set and the power gating cells in the second set are neighboring power gating cells in the stitching order, the stitching order being an order of sequence by which a power gating cell turns on its switch and forwards its control signal to a next power gating cell to turn on power gating cells in a time sequence.

9. The IC of claim 8, wherein the power gating cells are header cells.

10. The IC of claim 8, wherein the power gating cells are footer cells.

11. The IC of claim 8, wherein the stitching order of the power gating cells is optimized to reduce a number of neighboring power gating cells having a distance that exceeds a length threshold.

12. The IC of claim 11, further comprising:
- a buffer to transmit a control signal between two neighboring power gating cells when the distance between the two neighboring power gating cells exceeds the length threshold.

13. The IC of claim 8, wherein the stitching order of the plurality of power gating cells is optimized by a scan re-order hardware tool that re-orders scan cells based on a placement of the scan cells.

14. A non-transitory computer readable medium storing program instructions for causing a processor to perform integrated circuit (IC) design operations, comprising:
- determining a placement of a plurality of power gating cells and at least a circuit block in an IC layout, a first set of power gating cells and a second set of power gating cells being separated by the circuit block with a distance longer than a threshold; and
- optimizing a stitching order of the plurality of power gating cells for the placement to reduce a number of instances that the power gating cells in the first set and the power gating cells in the second set are neighboring power gating cells in the stitching order, the stitching order being an order of sequence by which a power gating cell turns on its switch and forwards its control signal to a next power gating cell to turn on power gating cells in a time sequence.

15. The non-transitory computer readable medium of claim 14, wherein the IC design operations further comprises:
- optimizing the stitching order of the plurality of power gating cells for the placement to reduce a number of neighboring power gating cells having a distance longer than a threshold.

16. The non-transitory computer readable medium of claim 14, wherein the IC design operations further comprises:
- generating a placement file having a plurality of scan cells, the scan cells being placed corresponding to the power gating cells;
- importing the placement file to a scan re-order hardware tool to generate an order of the scan cells; and
- swapping the scan cells in the generated order with corresponding power gating cells to generate the stitching order.

17. The non-transitory computer readable medium of claim 16, wherein the scan re-order tool is IC compiler.

* * * * *